United States Patent Office

3,057,861
Patented Oct. 9, 1962

3,057,861
BASIC DERIVATIVES OF TRIFLUOROMETHYL-
PHENOTHIAZINE COMPOUNDS
Klaus G. Florey, Princeton, Jack Bernstein, New Brunswick, Albert R. Restivo, Belleville, and Harry L. Yale, New Brunswick, N.J., assignors to Olin Mathieson Chemical Corporation, New York, N.Y., a corporation of Virginia
No Drawing. Filed Oct. 30, 1959, Ser. No. 849,747
6 Claims. (Cl. 260—243)

This application is a continuation-in-part of our parent application, Serial No. 644,484, filed March 7, 1957, and now abandoned.

This invention relates to, and has for its object the provision of a new improved process for preparing 2-(trifluoromethyl) substituted phenothiazines (and their salts) having valuable therapeutic properties, and new intermediates utilizable in said process.

The therapeutically-active (i.e. ataraxic) compounds preparable by the process of this invention include: (A) bases of the general formula

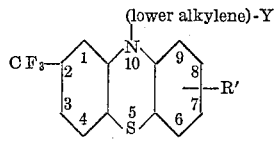

and (B) salts thereof, wherein R' is a member of the class consisting of hydrogen, lower alkyl, lower alkoxy, nitro, and amino, and Y is a basic saturated nitrogen-containing radical of less than twelve carbon atoms. The terms "lower alkylene," "lower alkyl," and "lower alkoxy," as employed herein, include both straight and branched chain radicals of less than eight carbon atoms.

Among the suitable radicals represented by the symbol Y are: amino; (lower alkyl)amino; di(lower alkyl)amino; (hydroxy-lower alkyl)amino; di(hydroxy-lower alkyl)-amino; (basic saturated monocyclic heterocyclic radicals of less than twelve carbon atoms), piperidyl [i.e., piperidino, 2-piperidyl, 3-piperidyl and 4-piperidyl]; (lower alkyl)piperidyl [e.g., 2, 3 or 4-(lower alkyl)piperidino or 2, 3 or 4-(N-lower alkyl)piperidyl]; di(lower alkyl)piperidyl [e.g., 2,4-, 2,6- or 3,5-di(lower alkyl)piperidino, or 2, 3 or 4-(N-lower alkyl-, 2, 3, or 4-lower alkyl)piperidyl]; (lower alkoxy)piperidyl; pyrrolidyl; (lower alkyl) pyrrolidyl; di-(lower alkyl)-pyrrolidyl; (lower alkoxy)pyrrolidyl; piperazyl; (lower alkyl)piperazino [e.g., N$^4$-methyl-piperazino]; (hydroxy lower alkyl)piperazino [e.g., N$^4$-hydroxy-ethylpiperazino]; di(lower alkyl)piperazino; (lower alkoxy)piperazino; (lower carbalkoxy)piperazine; (hydroxyalkoxyalkyl)piperazino [e.g., N$^4$-hydroxyethoxy-ethylpiperazino]; acyloxyalkylpiperazino [e.g., N$^4$-acetoxyethylpiperazino]; and other basic saturated monocyclic heterocyclic radicals of less than twelve carbons; and N-oxides of those radicals which are tertiary amines.

Preferably the lower alkylene group has a two or three carbon chain between the nitrogen in the position 10 and Y; R' is hydrogen; and Y is a di(lower alkyl) amino or a substituted piperazino group.

The salts (B) of the compounds prepared by the process of this invention include acid-addition salts, particularly non-toxic pharmacologically-acceptable acid-addition salts. Acids useful in preparing the addition salts comprise inter alia: organic acids—such as oxalic, tartaric, citric, succinic, acetic, theophylline, 8-chlorotheo-phylline, fumaric, lactic, and maleic; and inorganic acids, such as boric, nitric, sulfuric, phosphoric and (especially) hydrohalic, for example hydrobromic and hydrochloric acid.

Previous to this invention, these compounds were prepared by initially forming the 2-(trifluoromethyl)phenothiazine nucleus by thionating 3-(trifluoromethyl)diphenylamine and then adding the 10-substitutent by any one of a number of methods. The disadvantage of this method resided in the fact that when 3-(trifluoromethyl)diphenylamine was thionated, not one but a mixture of products were formed; one being the desired 2-(trifluoromethyl)phenothiazine and another the undesired 4-(trifloromethyl)phenothiazine isomer.

To obviate the disadvantages of this method, attempts were made to form the 2-(trifluoromethyl)phenothiazine nucleus by cyclizing 2-amino-4-(trifluoromethyl)2-nitrodiphenylsulfide. All such attempts, however, ended in failure in that the product obtained, rather than being the desired 2-(trifluoromethyl)phenothiazine was actually di-[2-(2-nitrophenylamino) - 3 - trifluoromethylphenyl]disulfide.

It has now been found, however, that if a 2-amino-4-(trifluoromethyl) - 2',X' - dinitrodiphenylsulfide, wherein X' represents any free position on the nitrophenyl nucleus, is employed as the reactant, the desired cyclization occurs in quantitative yields without any concomitant production of either the undesired disulfide by-product or the 4-(trifluoromethyl)phenothiazine isomer.

The process of this invention, therefore, resides in a sequence of steps involving first reacting 2-amino-4-(trifluoromethyl)thiophenol (I) or a salt thereof (preferably an alkali metal salt) with a 2,X-dinitrohalobenzene (II) to yield a 2-amino-4-(trifluoromethyl)-2',X-dinitrodiphenylsulfide (III). The reaction is preferably conducted in the presence of a base, such as an alkali metal hydroxide (e.g. potassium hydroxide), an alkali metal carbonate (e.g. sodium carbonate) or an alkali metal alcoholate (e.g. sodium methylate) in a solvent for the reactants, at any temperature from below room temperature to reflux. Suitable nitro-R'-substituted-1-halo-2-nitrobenzene reactants (II) include 2,4-dinitro-bromobenzene, 2,6-dinitro-bromobenzene, 2,4-dinitro-chlorobenzene, 3-methyl-2,6-dinitrochlorobenzene, 5-ethyl-2,4-dinitrochlorobenzene, 3-methoxy-2,4-(or 2,6)-dinitro-chlorobenzene, 2,6-dinitro-chlorobenzene, 2,4,6-trinitro-bromobenzene, and 5-methoxy-2,4 (or 2,6)-dinitro-chlorobenzene. Particularly preferred among these reactants is 2,4-dinitro-bromobenzene and 2,4-dinitro-chlorobenzene.

The resulting Compound III is then rearranged and cyclized by treatment with alkali to yield a 2-(trifluoromethyl)phenothiazine (V). Although Compound III may be employed directly as the reactant, it has been found that if Compound III is first acylated to its corresponding amide derivative (IV), prior to treatment with the alkali, the 2-(trifluoromethyl)phenothiazine (V) is obtained in higher yields. To effect this acylation, Compound III is treated with an acylating agent, such as an acyl halide or acid anhydride, or in the case of formic acid the acid itself. Suitable acylating agents include the acyl halides and acid anhydrides of lower alkanoic acids (e.g. acetic anhydride, propionic anhydride, n-butyryl chloride, and enanthic chloride) and monocyclic aromatic carboxylic acids (e.g. benzoyl chloride, p-chlorobenzoyl chloride, o-methoxybenzoyl chloride and p-toluyl chloride). The resulting amide (IV) is then rearranged and cyclized by treatment with alkali to yield a corresponding 2-(trifluoromethyl)phenothiazine (V).

The process for preparing the 2-(trifluoromethyl)-nitrophenothiazines (V) of this invention can be illustrated by the following equations:

wherein Y is as hereinbefore defined, and $R_4$ is hydrogen, lower alkyl, lower alkoxy or amino.

These amino compounds can then be diazotized and reduced to yield the known 10-substituted-2-(trifluoromethyl)phenothiazines, which have established utility as tranquilizing agents.

Alternatively, Compound V can first be reduced, as by

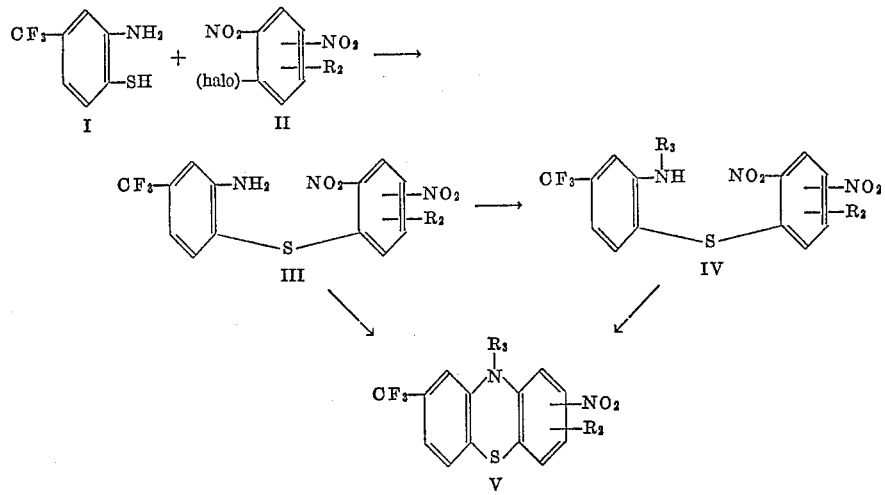

wherein $R_2$ is hydrogen, lower alkyl, lower alkoxy, or nitro, and $R_3$ is hydrogen, lower alkanoyl, benzoyl or substituted benzoyl, $R_3$ in Compound V being hydrogen if Compound III is rearranged and cyclized directly and otherwise being the acyl radical of Compound IV. Particularly preferred are compounds wherein $R_3$ is formyl.

If, as reactant II, an attempt is made to use a mononitrobenzene-halide, then the resulting Compound III or IV upon treatment with alkali yields only the undesired by-product VI:

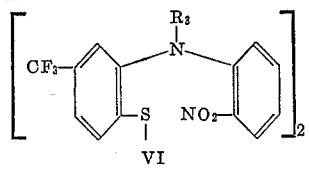

Compound V is then reacted with a halo (lower alkylene)-Y compound in a solvent for the reactants in the usual manner. Preferably the reaction is carried out in the presence of an acid acceptor, such as an alkali metal, an alkali metal alcoholate, and especially an alkali metal anhydride (for example, sodium hydride) or an alkali metal amide (for example, sodamide). The following halo (lower alkylene)-Y reactants may be used, inter alia: 3-piperidinopropyl chloride, 2-pyrrolidinoethyl chloride, 3-morpholinopropyl bromide, 2-diethylaminopropyl chloride, 3-diethylaminopropyl chloride, and 3-pyrrolidinopropyl chloride. The reaction results in the intermediates VII of this invention of the general formula:

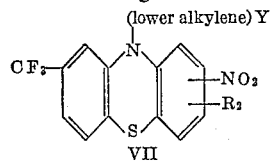

wherein $R_2$ and Y are as hereinbefore defined.

The nitro derivatives are reduced as by treatment with iron to yield the amino intermediates VIII of this invention of the general formula:

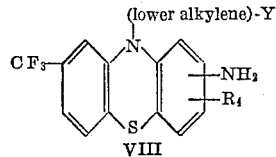

treatment with iron, to yield the amino intermediates IX of this invention of the general formula:

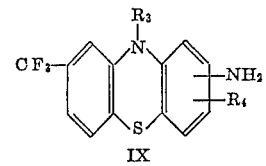

wherein $R_3$ and $R_4$ are as hereinbefore defined, and then diazotizing and reducing to eliminate the amino group(s) and treating with a halo(lower alkylene)-Y compound to yield Compound VIII.

Acid-addition salts of Compounds VII and VIII can be prepared in the usual manner employing preferably one of the pharmaceutically acceptable acids listed hereinbefore as the acid reactant.

The following examples are illustrative, but by no means limitative, of the invention.

EXAMPLE 1

*10-(3-Dimethylaminopropyl)-7-Nitro-2-(Trifluoromethyl)Phenothiazine*

A. *2-amino-4-(trifluoromethyl)-2',4'-dinitro diphenylsulfide.*—At room temperature and under an atmosphere of nitrogen, a slurry of 900 grams of the zinc salt of 2-amino - 4 - (trifluoromethyl) - thiophenol [cf. C.A. 47, 4769 (1953)], in 8 liters of absolute ethanol is treated with a solution of 216 grams of sodium methylate in 2 liters of dry methanol to form the sodium salt.

To a solution of the sodium salt is then added to a solution of 810 grams of 2,4-dinitro-chlorobenzene in absolute ethanol and the mixture is agitated and refluxed in an atmosphere of nitrogen for ½ hour. Then, 5 liters of water are added to the hot solutions and after a cooling period the crystals of 2-amino-4-(trifluoromethyl)-2',4'-dinitrodiphenylsulfide, M.P. about 180–183°, are collected.

B. *2-formamido - 4 - (trifluoromethyl) - 2',4'-dinitro-diphenylsulfide.*—One kilogram of 2-amino - 4 - (trifluoromethyl)-2',4'-dinitro-diphenylsulfide is refluxed in 10 liters of 90% formic acid for one hour. The solution is filtered hot to remove impurities. 23 liters of water are added to the cooled solution and the crystals of 2-formamido-4-(trifluoromethyl)-2',4'-dinitro-diphenylsulfide, M.P. about 172–174°, are collected.

C. *7-nitro-2-(trifluoromethyl)phenothiazine.*—At room temperature and in an atmosphere of nitrogen, 950 grams of 2-formamido-4-(trifluoromethyl) - 2',4'-dinitro-diphenylsulfide in 9.5 liters of dry acetone are treated with 2.5 liters of 1 N ethanolic NaOH. The mixture is refluxed for 45 minutes, cooled, and filtered from sodium nitrite. Addition of 10 liters of water to the filtrate causes precipitation of dark red crystals of 7-nitro-2-(trifluoromethyl)phenothiazine, M.P. about 205–210° (dec.).

D. *10-(3-dimethylaminopropyl) - 7 - nitro-2-(trifluoromethyl)phenothiazine hydrochloride.*—To 10 grams of 7-nitro-2-(trifluoromethyl)phenothiazine in 100 ml. of diethylene glycol dimethylether are added equimolar amounts of sodium amide and 3-dimethylaminopropyl-chloride. The mixture is stirred and heated to 110 for 2 hours under a blanket of nitrogen. The hot solution containing the free base, 10 - (3 - dimethylaminopropyl)-7-nitro - 2 - (trifluoromethyl)phenothiazine is filtered from insolubles (NaCl), acidified with hydrochloric acid and the hydrochloride salt of 10-(3-dimethylaminopropyl)-7-nitro-2-(trifluoromethyl)phenothiazine, M.P. about 240–245° (dec.) is collected.

EXAMPLE 2

*7-Amino-10-(3-Dimethylaminopropyl)-2-(Trifluoromethyl)Phenothiazine*

A mixture of 10 grams of 10-(3-dimethylaminopropyl)-7-nitro-2 - (trifluoromethyl)phenothiazine hydrochloride, prepared as described in Example 1, 32 grams reduced iron powder, and 1.7 grams of calcium chloride in 200 ml. of 75% ethanol is stirred and refluxed for 2 hours. The mixture is made strongly alkaline, filtered and the ethanol removed in vacuo. The residue, 7-amino-10-(3-dimethylaminopropyl)-2-(trifluoromethyl)phenothiazine, is taken up in benzene, washed with water, and the dihydrochloride salt of 7-amino-10-(3-dimethylaminopropyl)-2-(trifluoromethyl)phenothiazine, M.P. about 164–167°, is precipitated by addition of hydrochloric acid.

7-amino-10 - (3 - dimethylaminopropyl) - 2 - (trifluoromethyl)phenothiazine, and addition salts thereof prepared as described in Example 2, are especially useful in the preparation of other 10-(Y-alkylene)-(trifluoromethyl)-phenothiazines, such as, the tranquilizer drug, 10-(3-dimethylaminopropyl) - 2 - (trifluoromethyl)phenothiazine hydrochloride.

The latter can be readily prepared using the following method: To 4.1 grams of 7-amino-10-(3-dimethylaminopropyl) - 2 - (trifluoromethyl)phenothiazine dihydrochloride in 32 ml. of 1 N hydrochloric acid are added 820 mg. of sodium nitrite in 4.7 ml. of water at 0° C. Then, 90 ml. of 50% hypophosphorous acid are added (other reducing agents commonly used in deaminations, such as lower aliphatic alcohol may be used). The mixture is kept under refrigeration for 16 hours, made strongly alkaline, and the crude 10-(3-dimethylaminopropyl)-2-(trifluoromethyl)phenothiazine base extracted with ether. The crude base is purified by distillation or recrystallization of the oxalate.

The hydrochloride salt of the latter base is identical with an authentic sample of the hydrochloride of 10-(3 - dimethylaminopropyl) - 2 - (trifluoromethyl)phenothiazine (obtained as described in copending application Serial No. 597,325, filed July 12, 1956), as to M.P. (about 172°) and infra-red spectrum.

By the practice of this invention a substantially better overall yield of the latter hydrochloride is obtained, as compared to prior methods—and without isomers being formed.

EXAMPLE 3

Use of molar equivalent of 2,4,6-trinitrochlorobenzene in Example 1A in place of 2,4 - dinitrochlorobenzene yields initially 2 - amino - 4 - (trifluoromethyl - 2',4',6'-trinitrodiphenyl sulfide, and ultimately after cyclization, and introduction of, the side chain 10-(3-dimethylaminopropyl) - 7,9 - dinitro - 2 - (trifluoromethyl)phenothiazine hydrochloride. On reduction, the 7,9-diamino-10-(3-dimethylaminopropyl) - 2 - (trifluoromethyl)phenothiazine trihydrochloride is produced.

EXAMPLE 4

*7-Nitro-10-[3-(1-Piperidino)Propyl]-2-(Trifluoromethyl)Phenothiazine, Oxalate*

A mixture of 14 g. of 7-nitro-2-(trifluoromethyl)-phenothiazine, 2.3 g. of sodamide and 140 ml. of diethyleneglycol dimethyl ether is stirred and heated to about 100° and treated dropwise with 40 ml. of a 1.5 N solution of 3-(1-piperidinyl)propyl chloride. The mixture is then heated to about 110°, kept two hours at this temperature, and filtered while hot, with suction. The cooled filtrate is treated slowly with a solution of 4.5 g. of anhydrous oxalic acid in 50 ml. of acetonitrile. The crystalline red solid which separates is filtered to give about 19.8 g. of 7-nitro-10-[3-(1-piperidino)propyl]-2-(trifluoromethyl)phenothiazine, oxalate.

EXAMPLE 5

*7-Nitro-10-[3-(1-Pyrrolidyl)Propyl]-2-(Trifluoromethyl)Phenothiazine, Hydrochloride*

A suspension of 28 g. of 7-nitro-2-(trifluoromethyl)-phenothiazine, 4.5 g. of sodamide and 280 ml. of diethyleneglycol dimethyl ether is stirred and heated to about 95° and the mixture treated dropwise with a solution of 16.2 g. of 3-(1-pyrrolidyl) propyl chloride in 75 ml. of dry toluene. Subsequently, the mixture is heated to about 110° and maintained at this temperature for two hours. The hot reaction mixture is filtered, the filtrate is cooled and treated slowly with 25 ml. of a 4 N ethereal hydrogen chloride solution. The red solid which separates is filtered and dried to give about 36.4 g. of 7 - nitro - 10 - [3 - (1 - pyrrolidyl)propyl] - 2-(trifluoromethyl)phenothiazine, hydrochloride.

EXAMPLE 6

*2-Acetamido-4-(Trifluoromethyl)-2',4'-Dinitrodiphenylsulfide*

To 100 grams of 2-amino-4-(trifluoromethyl)-2',4'-dinitrodiphenylsulfide is added 100 ml. of acetic anhydride. With mild agitation, the temperature is brought to about 100° C. and kept at this point for about one hour. With strong agitation, 33 ml. of water (2 mole equiv.) is slowly added to the reaction mixture, while maintaining heat application. The temperature rises to about 115–120° C. The resulting acetic acid solution is then heated at reflux (105° C.) for one hour. With cooling, 200 ml. of water is added over a period of 10 minutes. The mixture is then kept at 20° C. for one hour, filtered, and the product washed with water until no acid remains. The brownish crystals which are in the form of small pellets are dried in vacuo at 75° C. Melting point about 164–168° C.; yield about 98 grams.

EXAMPLE 7

*2-Benzamido-4-(Trifluoromethyl)-2',4'-Dinitrodiphenyl Sulfide*

One hundred grams of 2-amino-4-(trifluoromethyl)-2',4'-dinitrodiphenyl sulfide is mixed with 136 grams of benzoyl chloride. With mild agitation, the temperature is brought to 100° C. and kept at this point for one and one-half hours. After cooling to 30° C., 55 grams of pyrridine is added slowly with agitation. The temperature rises sharply and is kept below 75° C. by external cooling, 250–300 milliliters of water is then added slowly, using the same precautions (external cooling) against overheating. The mixture is kept at 20° C. for one hour, filtered, and the product washed with water until no acid remains.

EXAMPLE 8

*2-p-Chlorobenzoyl-4-(Trifluoromethyl)-2',4'-Dinitrodiphenylsulfide*

By replacing the benzoyl chloride of Example 7 with 171 grams of p-chlorobenzoyl chloride and maintaining the reaction temperature at 100° C. for two hours, 2-chlorobenzamido - 4 - (trifluoromethyl) - 2',4' - dinitrodiphenylsulfide is obtained.

EXAMPLE 9

*2-o-Methoxybenzamido-4-(Trifluoromethyl)-2',4'-Dinitrodiphenylsulfide*

By replacing the benzoyl chloride of Example 7 with 167 grams of o-methoxy-benzoyl chloride and maintaining the reaction temperature at 100° C., for two hours, 2 - o - methoxybenzamido - 4 - (trifluoromethyl) - 2',4'-dinitrodiphenylsulfide is obtained.

EXAMPLE 10

*2-Propionamido-4-(Trifluoromethyl)2',4'-Dinitrodiphenylsulfide*

By replacing the benzoyl chloride of Example 7 with 152 grams of propionyl chloride and refluxing the mixture at 80° C. for one hour with agitation, 2-propionamido - 4 - (trifluoromethyl) - 2',4' - dinitrodiphenylsulfide is obtained.

EXAMPLE 11

*2-Butyramido-4-(Trifluoromethyl)-2',4'-Dinitrodiphenylsulfide*

By replacing the benzoyl chloride of Example 7 with 166 grams of n-butyryl chloride and refluxing the mixture at 102° C. for one hour with agitation, 2-butyramido-4-(trifluoromethyl) - 2',4' - dinitrodiphenylsulfide is obtained.

EXAMPLE 12

*7-Nitro-10-Acetyl-2-(Trifluoromethyl)Phenothiazine*

Ninety-eight grams of 2-acetamido-4-(trifluoromethyl)-2',4'-dinitrodiphenylsulfide is dissolved in 500 ml. of acetone and filtered. 12.2 g. of potassium hydroxide is added as a 4 N 95% alcoholic solution to the acetone solution. The mixture is then heated to reflux for a 45-minute period. One liter of water is added and the solution is cooled to 10° C. After one hour, the brown crystals of 7-nitro-10-acetyl-2-(trifluoromethyl)phenothiazine are filtered and washed with water. Melting point about 165–170° C.; yield about 70.5 grams (about 91%).

EXAMPLE 13

*7-Nitro-10-Benzoyl-2-(Trifluoromethyl)Phenothiazine*

By replacing the 2-acetamido-4-(trifluoromethyl)-2',4'-dinitro-diphenylsulfide of Example 12 with 2-benzamido-4-trifluoromethyl-2',4'-dinitro-diphenylsulfide and reacting with 1-mole equivalent of potassium hydroxide 7-nitro-10-benzoyl-2-(trifluoromethyl)phenothiazine is obtained.

EXAMPLE 14

*7-Nitro-10-p-Chlorobenzoyl-2-(Trifluoromethyl)Phenothiazine*

By replacing the 2-acetamido-4-(trifluoromethyl)-2',4'-dinitro-diphenylsulfide of Example 12 with 2-p-chlorobenzamido-4-trifluoromethyl - 2',4' - dinitro - diphenylsulfide and reacting with 1-mole equivalent of potassium hydroxide, 7 - nitro - 10 - p-chlorobenzoyl - 2 - (trifluoromethyl)2-phenothiazine is obtained.

EXAMPLE 15

*7-Nitro-10-o-Methoxybenzoyl-2(Trifluoromethyl)Phenothiazine*

By replacing the 2-acetamido-4-(trifluoromethyl)-2',4'-dinitro-diphenylsulfide of Example 12 with 2-o-methoxybenzamido-4-(trifluoromethyl)-2',4'-dinitro - diphenylsulfide and reacting with 1-mole equivalent of potassium hydroxide, 7-nitro-10 - o - methoxybenzoyl - 2 - (trifluoromethyl)-phenothiazine is obtained.

EXAMPLE 16

*7-Nitro-10-Propionyl-2-(Trifluoromethyl)Phenothiazine*

By replacing the 2-acetamido-4-(trifluoromethyl)-2',4'-dinitro-diphenylsulfide of Example 12 with 2-propionamido-4-(trifluoromethyl)-2',4' - dinitro - diphenylsulfide and reacting with 1-mole equivalent of potassium hydroxide, 7-nitro-10-propionyl-2-(trifluoromethyl)phenothiazine is obtained.

EXAMPLE 17

*7-Nitro-10-Butyryl-2-(Trifluoromethyl)Phenothiazine*

By replacing the 2-acetamido-4-(trifluoromethyl)-2',4'-dinitro-diphenylsulfide of Example 12 with 2-butylamido-4-trifluoromethyl-2',4'-dinitro-diphenylsulfide and reacting with 1 mole equivalent of potassium hydroxide, 7-nitro-10-butyryl-2-(trifluoromethyl)phenothiazine is obtained.

By substituting these 7-nitro-10-acyl-2-(trifluoromethyl)phenothiazines of Examples 12–17 for the 7-nitro-(2-trifluoromethyl) in Example 1D, 10-(3-dimethylaminopropyl)-7-nitro-(trifluoromethyl)phenothiazine hydrochloride is obtained.

Compounds VIII of this invention and non-toxic salts thereof are also useful as ataraxics. Thus, 7-amino-10-(3 - dimethylaminopropyl) - 2 - (trifluoromethyl)phenothiazine dihydrochloride can be administered in the same general way (that is, orally, intramuscularly, and intravenously in an appropriately adjusted dosage), as chloropromazine hydrochloride, to alleviate manifestations of anxiety, tension, and agitation in both psychoneurotics and psychotics.

The invention may be variously otherwise embodied within the scope of the appended claims.

What is claimed is:

1. A compound selected from the class consisting of bases of the formula

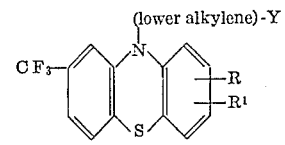

wherein R is selected from the class consisting of nitro and amino, $R^1$ is selected from the class consisting of hydrogen, lower alkyl, lower alkoxy, nitro and amino, and Y is selected from the class consisting of amino, (lower alkyl)amino, di(lower alkyl)amino, (hydroxy-lower alkyl)amino, di(hydroxy-lower alkyl)amino, piperidyl, (lower alkyl)piperidyl, di(lower alkyl) piperidyl, (lower alkoxy)piperidyl, pyrrolidyl, (lower alkyl)pyrrolidyl, di(lower alkyl)pyrrolidyl, (lower alkoxy)pyrrolidyl, piperazyl, $N^4$-(lower alkyl)piperazino, di(lower alkyl)piperazino, $N^4$-(hydroxy-lower alkyl)piperazino, and $N^4$-(lower carbalkoxy)piperazino, and non-toxic, pharmacologically acceptable acid-addition salts of said bases.

2. A compound of the formula:

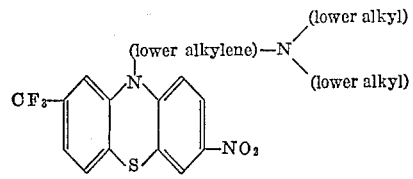

3. A compound of the formula:

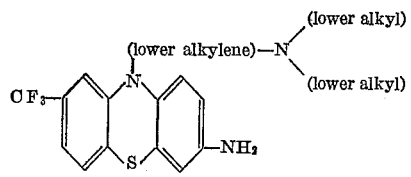

4. 10 - (3 - dimethylaminopropyl) - 7 - nitro - 2 - (trifluoromethyl)phenothiazine.

5. 10 - (3 - dimethylaminopropyl) - 7 - nitro - 2 - (trifluoromethyl)phenothiazine hydrochloride.

6. 10 - (3 - dimethylaminopropyl) - 7 - amino - 2 - (trifluoromethyl)phenothiazine.

References Cited in the file of this patent

UNITED STATES PATENTS

| | | |
|---|---|---|
| 2,464,885 | Olpin | Mar. 22, 1949 |
| 2,519,886 | Charpentier | Aug. 22, 1950 |
| 2,587,660 | Smith | Mar. 4, 1952 |
| 2,591,679 | Cusic | Apr. 8, 1952 |
| 2,645,640 | Charpentier | July 14, 1953 |
| 2,678,926 | Smith | May 18, 1954 |
| 2,694,705 | Cusic | Nov. 16, 1954 |
| 2,765,341 | Wirth et al. | Oct. 2, 1956 |
| 2,921,069 | Ullyot | Jan. 12, 1960 |

FOREIGN PATENTS

| | | |
|---|---|---|
| 837,536 | Germany | Apr. 28, 1952 |

OTHER REFERENCES

Baltzly: J.A.C.S., vol. 68 (1946), pages 2673–2678.

Burger: J. Org. Chem., vol. 19, No. 2 (1954), pages 1841–1846.

Massie: Chem. Reviews, vol. 54 (1954), pages 798–833.

Yale: J.A.C.S., vol. 77 (1955), pages 2270–2272.

Florey et al.: J. Org. Chem., vol. 23, pages 1018–21 (1958).